United States Patent
Ruppert et al.

(10) Patent No.: US 6,338,512 B1
(45) Date of Patent: Jan. 15, 2002

(54) CLAMP ACTION SHOVEL FOR SINGLE HAND OPERATION

(76) Inventors: Jonathan Paul Ruppert, 17147 Heatherwood Way, Morgan Hill, CA (US) 95037; Mark Allen Ruppert, 1539 Woodland Ct., Tracy, CA (US) 95376

(*) Notice: Subject to any disclaimer, the term of this patent is extended or adjusted under 35 U.S.C. 154(b) by 0 days.

(21) Appl. No.: 09/775,960

(22) Filed: Jan. 31, 2001

Related U.S. Application Data

(63) Continuation-in-part of application No. 29/123,359, filed on Jan. 31, 2000, now abandoned.

(51) Int. Cl.$^7$ .................................................. A01B 1/18
(52) U.S. Cl. ....................................................... 294/50.8
(58) Field of Search .................. 294/28, 50.5–50.9, 294/53.5, 115; 111/99, 101, 106; 172/371, 372

(56) References Cited

U.S. PATENT DOCUMENTS

| | | | | |
|---|---|---|---|---|
| 409,949 A | * | 8/1889 | Foster ................... | 294/50.8 X |
| 652,077 A | * | 6/1900 | Burson .................. | 294/50.8 |
| 682,021 A | * | 9/1901 | Bennett ................. | 294/50.8 |
| 1,212,303 A | * | 1/1917 | Wilt ..................... | 294/50.8 X |
| 2,510,584 A | * | 6/1950 | Kanagawa ............. | 294/50.8 X |
| 3,050,327 A | * | 8/1962 | Kuntz ................... | 294/50.5 |

FOREIGN PATENT DOCUMENTS

| | | | | |
|---|---|---|---|---|
| DE | 129603 | * | 4/1902 | .............. 294/50.8 |

* cited by examiner

*Primary Examiner*—Johnny D. Cherry
(74) *Attorney, Agent, or Firm*—Gene Scott - Patent Law & Venture Group

(57) ABSTRACT

A shovel apparatus for digging holes has an H-shaped frame providing at one end, a handle integrally joined to the frame, and at the other end, a blade mounting support. A pair of spaced apart shovel blades are pivotally engaged with the blade mounting support for drawing the blades from essentially parallel rest positions, toward each other, to form a modified cone-shaped enclosure. A draw arm assembly is engaged for sliding within a pair of opposing slots in the H-shaped frame. The draw arm assembly is engaged with the shovel blades through a pair of links to move the shovel blades toward each other when the draw arm assembly is pulled toward the handle.

4 Claims, 4 Drawing Sheets

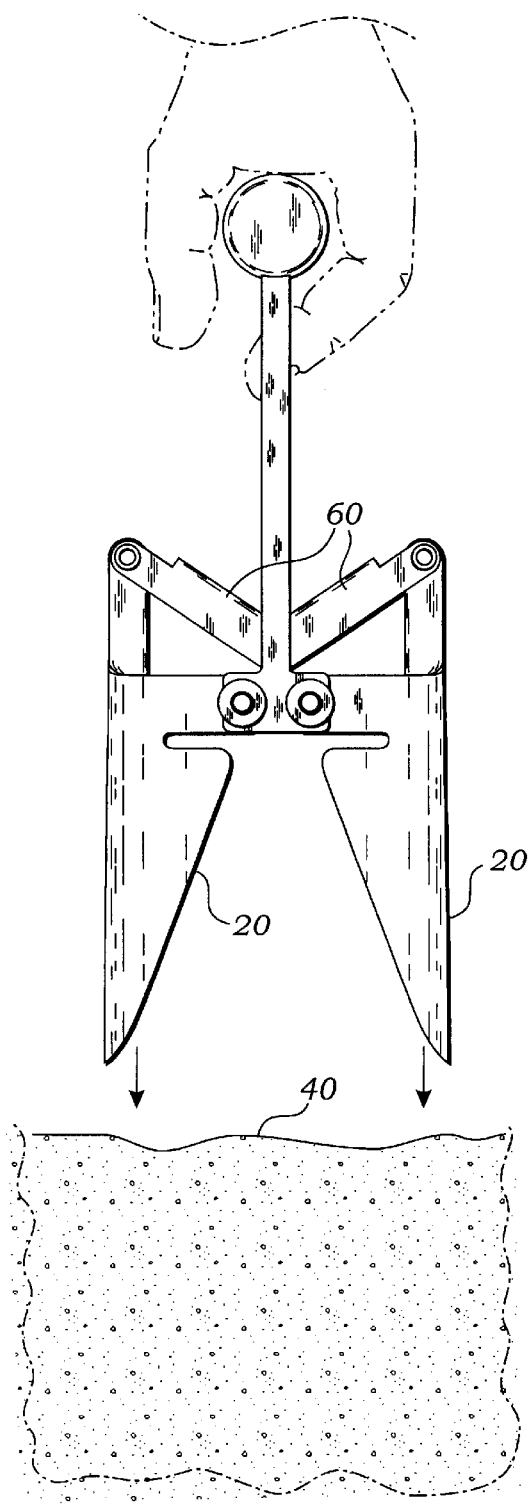
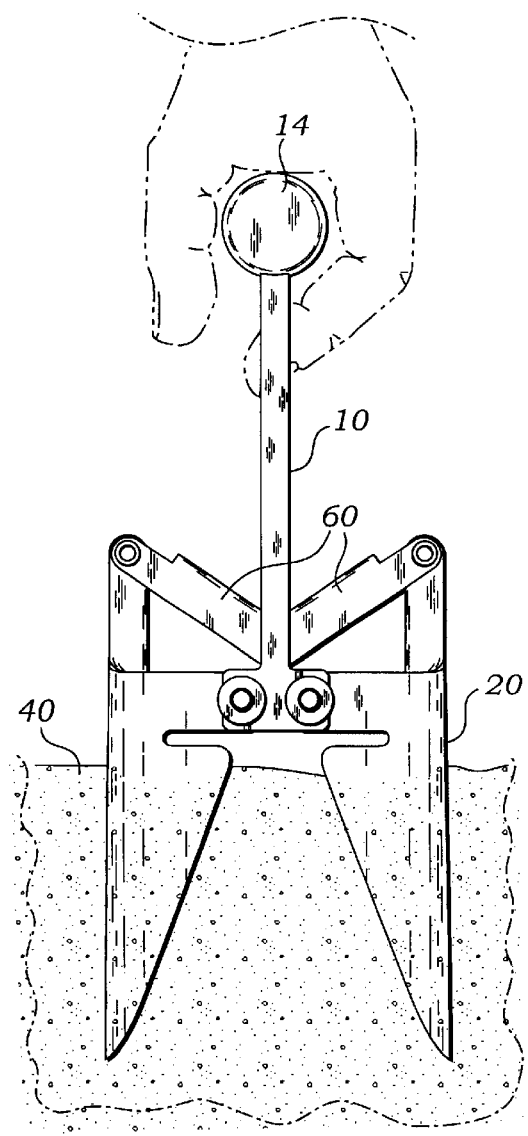
Fig. 3
Fig. 4

CLAMP ACTION SHOVEL FOR SINGLE HAND OPERATION

This UTILITY patent application is a continuation-in-part of a previously filed design patent application having serial number 29/123,359 and an official filing date of Jan. 31, 2000, now abandoned, and which discloses substantially the same material as described herein.

BACKGROUND OF THE INVENTION

1. Field of the Invention

This invention relates generally to small hand shovels and more particularly to a shovel with dual blades and a mechanism for drawing the blades together in a clamping action for preparing a hole in an earthen surface.

2. Description of the Related Art

Many forms of shovel are known in the art. These include single bladed shovels for moving coal, earth and snow. A coal shovel is formed as a scoop so as to retain the coal pieces while moving a shovel full. Earth moving shovels may take several forms including the well known rounded front edge shovel for digging holes and the flat front edged shovel for picking-up loose material from a hard surface, also known as a spade. Snow shovels are generally made with a flat front edge and a broad width which seems to work well with this material. Dual opposing blade shovels are known as post diggers and generally incorporate a means for drawing the blades together to hold earth between the blades. A common variety of this type of shovel is merely a pair of shovels mounted together with a hinged arrangement.

The prior art teaches the use of post digger shovels but does not teach a small such article having manual linkages for digging a hole with a single motion of the squeezing action of one hand. The present invention fulfills these needs and provides further related advantages as described in the following summary.

SUMMARY OF THE INVENTION

The present invention teaches certain benefits in construction and use which give rise to the objectives described below.

A shovel apparatus for digging holes has an H-shaped frame providing at one end, a handle integrally joined to the frame, and at the other end, a blade mounting support. A pair of spaced apart shovel blades are pivotally engaged with the blade mounting support for drawing the blades from essentially parallel rest positions, toward each other, to form a modified cone-shaped enclosure. A draw arm assembly is engaged for sliding within a pair of opposing slots in the H-shaped frame. The draw arm assembly is engaged with the shovel blades through a pair of links to move the shovel blades toward each other when the draw arm assembly is pulled toward the handle. In use the apparatus is held in one hand and by squeezing the draw arm assembly toward the handle the shovel blades are drawn into convergence thereby holding a load of earth or soil.

A primary objective of the present invention is to provide an apparatus and method of use of such apparatus that provides advantages not taught by the prior art.

Another objective is to provide such an invention capable of scooping a portion of soil out of a hole.

A further objective is to provide such an invention capable of simple manual manipulation of a pair of opposing shovel blades.

A still further objective is to provide such an invention capable of automatically returning the blades to a spread apart attitude by relieving pressure on an actuating bar of the invention. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIGS. 3–6 are side elevational views thereof defining the primary use of the invention.

DETAILED DESCRIPTION OF THE INVENTION

The above described drawing figures illustrate the invention in at least one of its preferred embodiments, which is further defined in detail in the following description.

Figure 1:
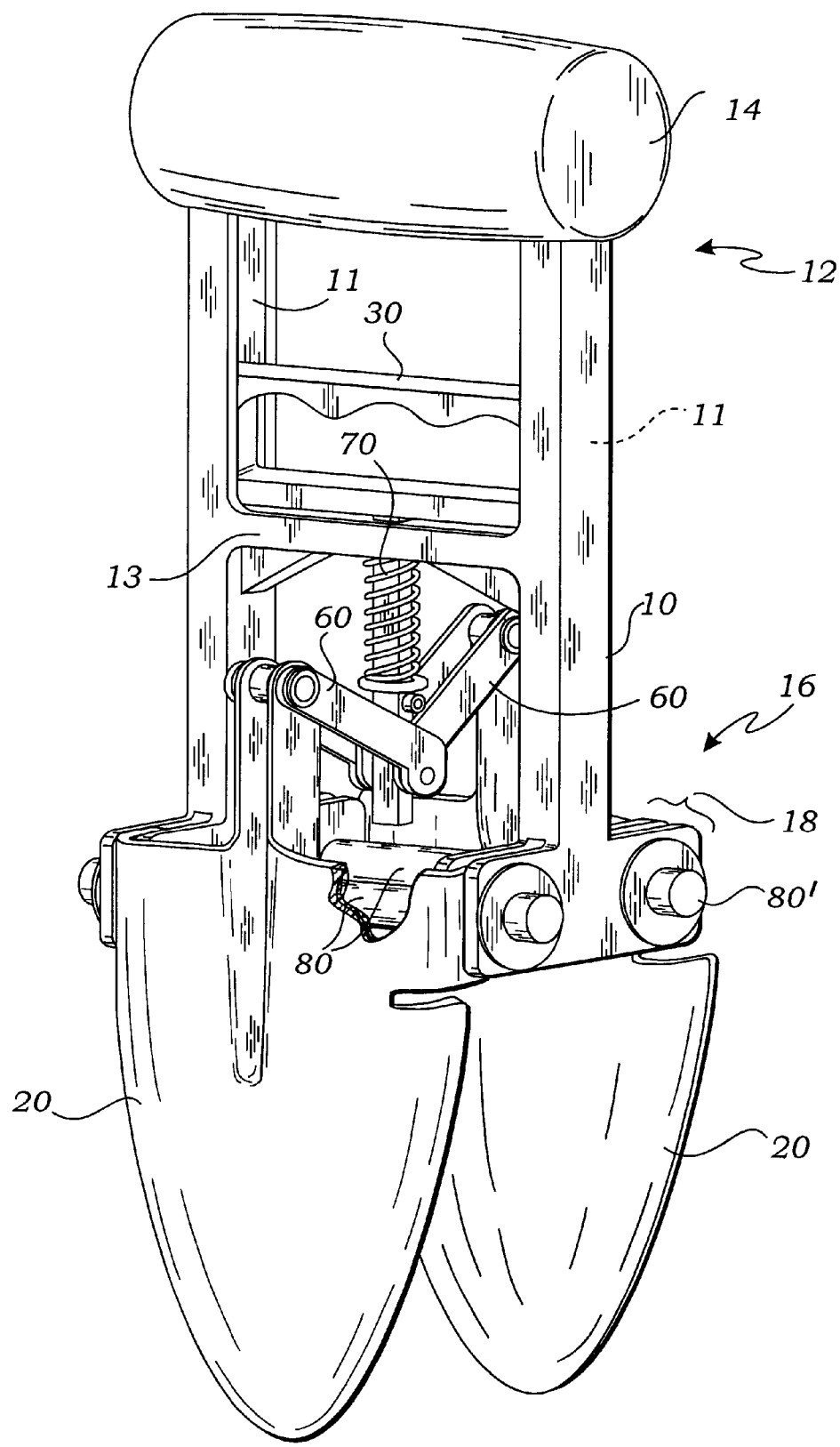
FIG. 1 is a prospective view of the preferred embodiment of the invention shown in its relaxed state.
Figure 2:
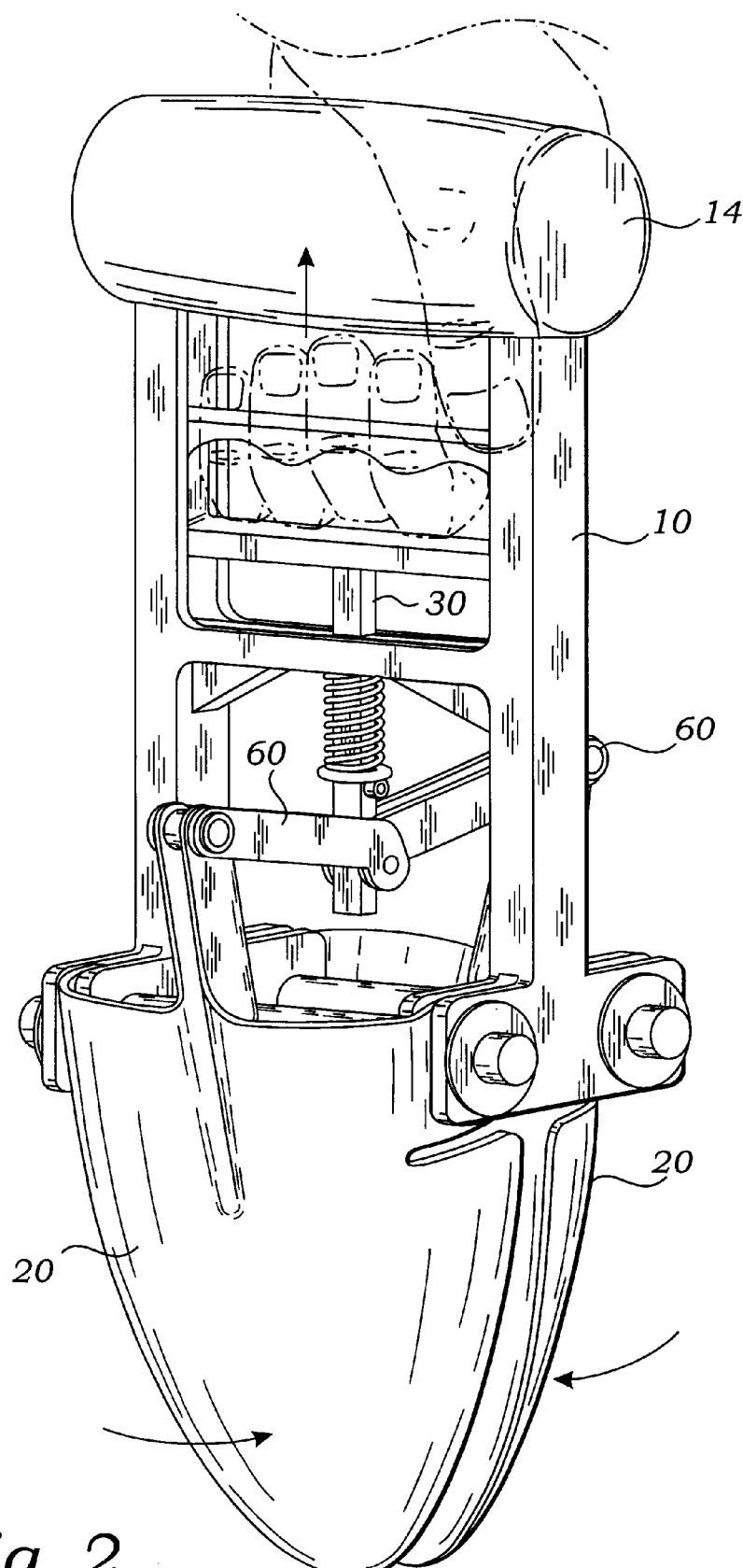
FIG. 2 is similar to FIG. 1, shown in its clamped state.
Figure 5:
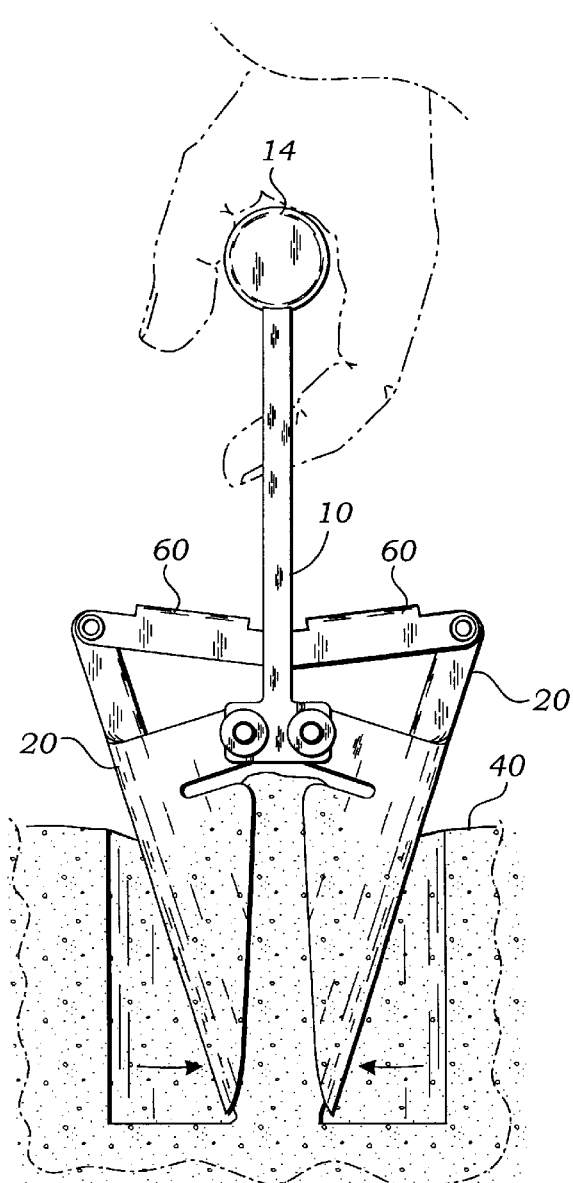
Figure 6:
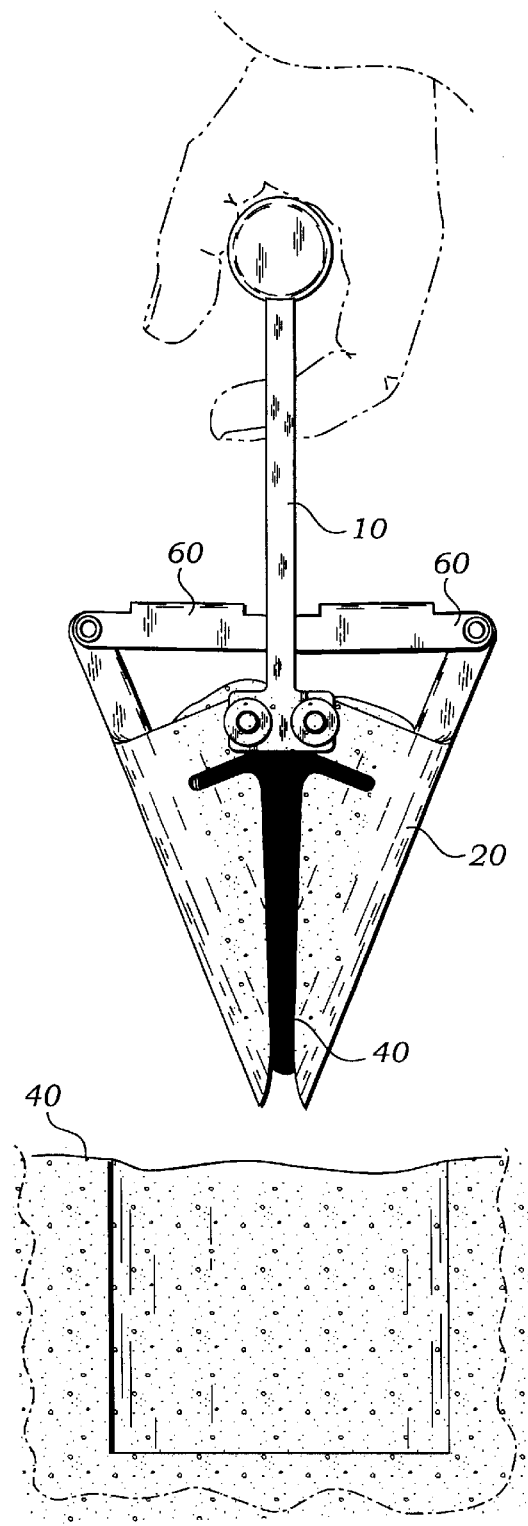

The present invention is a shovel apparatus for digging holes and comprises: an H-shaped frame providing, at one end 12 thereof, a handle 14 integrally joined thereto, and at the other end 16 thereof, a blade mounting support 18. The apparatus further comprises a pair of spaced apart shovel blades 20 pivotally engaged with the blade mounting support 18, and a means for drawing of the shovel blades 20 from essentially parallel rest positions, as shown in FIG. 1, toward each other, as shown in FIG. 2, to form a modified cone-shaped enclosure for holding a working medium such as soil 40 therein. The drawing means is preferably a draw arm assembly 30 engaged for sliding within a pair of opposing slots 11 in the H-shaped frame 10 and is pivotally engaged with the shovel blades 20 through a pair of links 60 to move the shovel blades 20 toward each other when the draw arm assembly 30 is moved toward the handle 14. This action is clearly shown in FIG. 2. Preferably, the draw arm assembly 30 further comprises a bias means 70, such as the coil spring shown in FIGS. 1 & 2, mounted as part of the draw arm assembly 30 for functionally urging the draw arm assembly 30 away from the handle 14. It is able to accomplish this because one end of the coil spring 70 rests against a fixed center bar 13 of the H-shaped frame 10. Preferably, a pair of axles 80 are engaged with the blade mounting support 18 and the shovel blades 20 such that the blades 20 are able to rotate about the axles 80. These axles 80 are preferably made of steel so as to provide rigidity to the lower end 16 of the H-shaped frame and hard surfaces for rotational bearing of the shovels 20. The axles 80 are preferably positioned in parallel, spaced apart, positions as clearly shown in FIG. 1, and are held in place using cap-nuts 80'. The manual force transferred to blades 20 through linkages 60 is highly amplified since the links 60 move through an excursion of about 45 degrees to approaching a horizontal attitude wherein maximum leverage is applied.

In use, the apparatus is held in one hand and driven into the working medium (soil, earth, gravel, etc.) with the shovel blades entering the ground normally. Once the blades have been sunk into the ground, by squeezing the draw arm assembly toward the handle the shovel blades are drawn into convergence thereby gripping a load of the working medium, and the load may then be lifted out of the hole that is thereby created. A relatively square sided hole is able to be produced in this manner as shown in FIGS. 3–6.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shovel apparatus for digging holes which comprises: an H-shaped frame providing spaced-apart legs, a handle integrally joined thereto, and a pair of spaced apart shovel blades pivotally joined thereto; a draw arm assembly adapted for sliding within a pair of opposing elongated slots in the H-shaped frame, the draw arm assembly engaged with the shovel blades through a pair of links to move the shovel blades toward each other when the draw arm assembly is moved toward the handle.

2. The apparatus of claim 1 wherein the draw arm assembly further comprises a bias means functionally urging the draw arm assembly away from the handle.

3. The apparatus of claim 1 further comprising a pair of axles engaged with the blade mounting support and the shovel blades.

4. A method of forming a square sided hole in a working medium which comprises: driving a digging tool, having a pair of parallel shovel blades, into the working medium with the blades entering the working medium normally; resting the palmer surface of a hand on a handle of the digging tool and enclosing the fingers of the hand about a draw arm assembly thereof; tightening the fingers of one hand to pull the draw arm assembly toward the handle to move the blades into convergence; and lifting a load of the working medium captured between the blades.

* * * * *